J. S. Marsh.
Harvester Rake.
No 2354 Reissued Sep. 11, 1866.
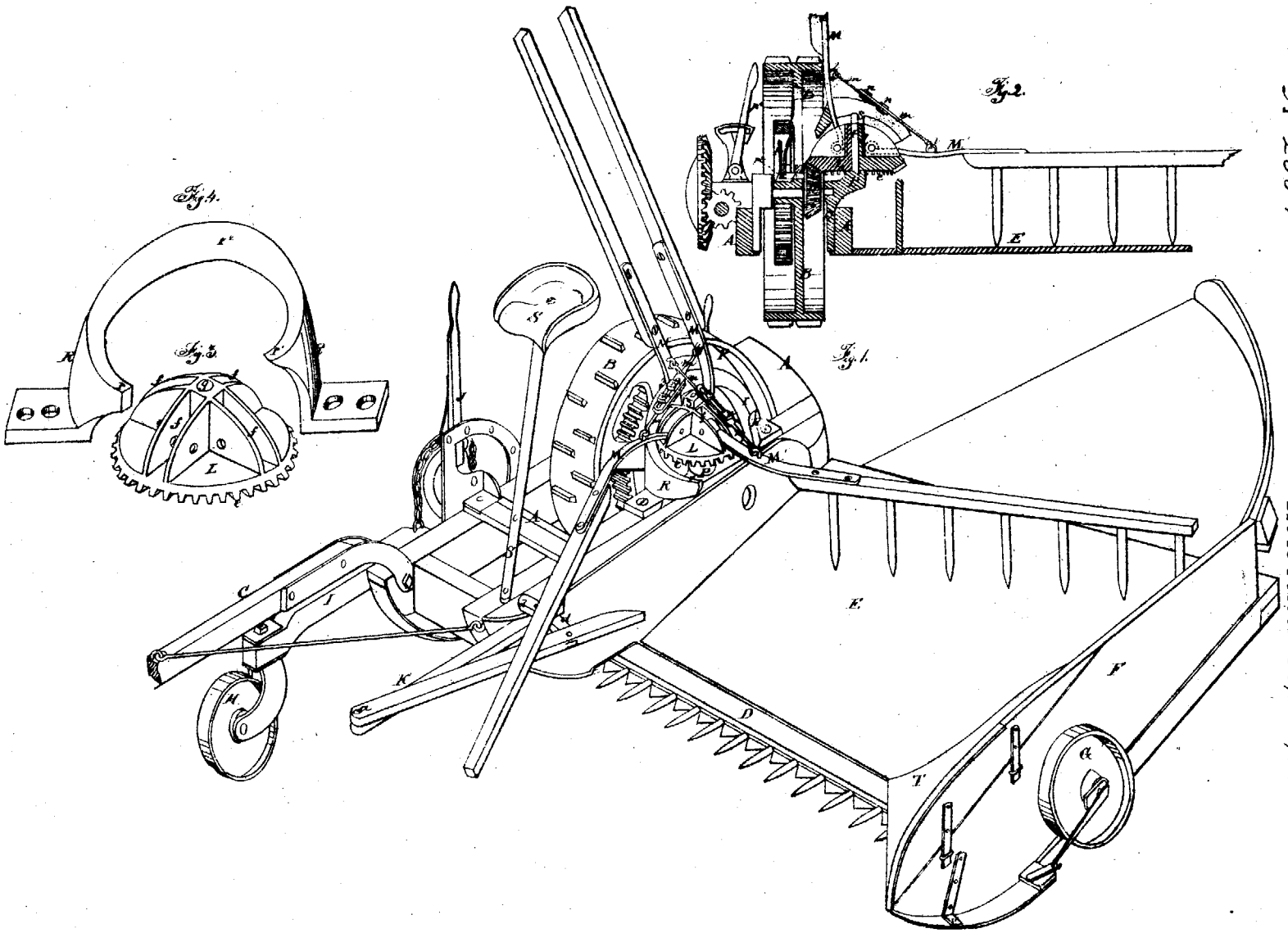

UNITED STATES PATENT OFFICE.

JAMES S. MARSH, OF LEWISBURG, PENNSYLVANIA.

IMPROVEMENT IN HARVESTERS.

Specification forming part of Letters Patent No. 37,630, dated February 10, 1863; Reissue No. 2,354, dated September 11, 1866.

*To all whom it may concern:*

Be it known that I, JAMES S. MARSH, of Lewisburg, in the county of Union and State of Pennsylvania, have invented a new and useful Improvement in Harvesters with Automatic Rakes; and I do hereby declare that the following is a full, clear, and exact description of the same, reference being had to the accompanying drawings, forming part of this specification, in which—

Figure 1 is a perspective view, Fig. 2 a transverse section, and Figs. 3 and 4 details, of my improvement applied to a harvester.

Similar letters of reference in the several figures indicate corresponding parts.

A is a side-draft frame of a harvester; B, the driving-wheel; C, the tongue; D, the finger-beam; E, the platform; F, the outer guard, and G the small supporting-wheel.

The machine is adjusted on the axle of the drive-wheels by means of a compound-lever arrangement, I J.

Thus far described the machine has previously been in use, and I have referred to the parts here in order to facilitate the description of my invention and to show that the improvements I have made are adjustable with the finger-beam and platform on a draft-frame which has the drive-wheel as its axis of motion and the cutting apparatus in front of drive-wheel.

My first improvement is a grain-guard, K, made so as to open and shut on a pivot or joint, *a*, and arranged on the front end of the inner beam of the draft-frame A, as shown in Fig. 1 of the drawings. One limb of this guard extends forward on a slightly-oblique line and is not adjustable. From the extreme forward end of this fixed limb another limb extends back far enough to slightly overhang the finger-beam. Near the rear extremity of this second limb a curved link, *d*, is attached. This link is flat and perforated with a series of holes, and it extends over the first limb, as represented. With this arrangement the grain, while the machine is operating, is prevented from falling over upon the draft-frame, and the grain is also caused to fall upon the platform at a point away from the inner guard thereof. The extent of distance that the grain falls away from the guard can be regulated at pleasure by moving the curved link to the right or left and inserting a pin in one of the holes therein. This adjustment of the link causes the second limb of the guard to have a greater or less obliquity to the path of the machine, and as is the obliquity so will be the deposit of the grain upon the platform with respect to the inner guard thereof. If the grain is much bent over toward the draft-frame, the obliquity must be great; but if it stands straight, then the obliquity may be slight. This grain-guard at the point shown is as essential as the adjustable dividers or guides used on the off side of the platform.

My second improvement comprises a combined rake and reel; also a novel arrangement of such rake and reel; likewise a combination of a rake and reel combined, a draft-frame, a driver's seat, and an adjusting contrivance; and also an outer or off-side device in combination with the combined rake and reel and with the outer divider.

My rake is constructed upon a crown-wheel, L, which has bevel-teeth *e* on its under side and four open boxes, *f f f f*, on its upper side, arranged around a common tubular center, *g*, as represented. The top of the crown-wheel is hollowed out so as to accommodate the inner or pivoted ends of the rake-arms and reel-bar arms as the same rise and fall in the path of a vertical circle while moving with the crown-wheel in the path of a horizontal circle, or, more strictly speaking, as the arms rise and fall on their respective axes of motion while moving around the axis of the crown-wheel. To the crown-wheel four curved or bent arms, M M M M′, are pivoted or hinged so that their inner ends rest loose, but fit snugly, in the boxes *f*, as shown. One of these arms is provided with a rake-head with teeth, and the others are furnished with straight reel-bars, as represented. Each of the respective arms has an axis, on which it rises and falls, but while this is so the arms are linked together in pairs, one pair being independent of the other in the vertical movement of the arms, but both pairs moving round together in the horizontal movement of the rake. The linking devices are designated by the letter *m m′*. The part *m* is slotted and the part *m′* is furnished with one or more screw-holes, and the respective parts are connected by an eye to staples *l l* of the curved arms. Set-screws *n n*, which pass through the slots into the screw-holes of the devices *m m′*, are used to connect the parts of said devices together and to adjust the arms of rake and reel bars as occasion may require.

Any other mechanical device, such as a link, nut, and two hinged screws or the equivalent thereof, may be used in place of the devices *m m'*.

The arms M M M M' are curved, as shown, so that the rake-head and reel-bars may be made shorter than usual in such revolving rakes and reels combined, and still be capable of sweeping the entire width of the platform. The curve also insures the descent of the innermost tooth of the rake-head upon grain lying upon the platform near the innermost front corner thereof. It also allows the arms M M M M' to assume an upright position and move around the axis of the crown-wheel clear of the inner drive-wheel, said upright position being such that the rake and reel bars do not interfere in the least with the driver, who is seated on the machine. Nor are these bars interrupted in their motion by the drive-wheel, although the crown-wheel is located below the top or circumference of said drive-wheel and some distance from the grain side of the same.

The rake and reel as above constructed I prefer to locate on the inner side beam of the draft-frame and over the inner segment-box, O, of the drive-wheel. To thus locate the rake and reel I prefer to cast the segment-box and the vertical shaft of the crown-wheel in one piece, as shown at O P, Fig. 2; and in order to effect this I make a suitable durable bearing, P, and set it in a mold and cast the segment-box upon it. The set of the vertical shaft P must be at right angles to the platform, or nearly so.

After I have obtained the lowest adjustment of the platform I adopt that as my guide, because the other adjustments of the whole machine will either be produced by a movement on the drive-wheel axle or an adjustment of the segment-boxes, and in either case the rake will conform to the platform unless the platform warps, in which case the links will serve as a compensating means. The vertical shaft P extends through the tubular bearing or center of the crown-wheel and receives a nut, *s*, on its tip end.

A small pinion bevel-wheel, Q, is arranged on the drive-wheel shaft, so as to gear with the crown-wheel, as shown. This pinion is fitted loosely, but by means of a pin, *p*, is made fast as occasion may require. The pin *p* has a turning movement in one of the arms of the drive-wheel, and is furnished with a lever-arm, *p'*, so that such movement may easily be imparted to it. The pin also has a sliding movement while it is turning. To produce this latter movement a cam, $p^2$, is arranged on the drive-wheel in the relation shown to the lever-arm. The cam is a fixture with the drive-wheel, and it, by reason of its inclined or cam edge $p^2$, draws the pin out of the hole $p^3$ of the pinion bevel-wheel when the lever is moved in a reverse direction. The pin and loose pinion enable me to throw the rake in and out of operation at will.

The rake-head and a reel-bar and the pair of reel-bars are so linked in pairs together that each linked pair forms a right angle, or nearly so, or so that when the rake-head or reel-bar of one pair is horizontal the fellow thereto is vertical, or nearly so.

In order to guide and stay the rake-head and reel-bars in their movements, I arrange a segment of an elliptic cam, R, around and partially over the crown-wheel L, so that the pivoted ends of the rake-head and reel-bars are some distance below its highest part, as represented. The top edge of this cam is beveled, as indicated at *r r'*, and these beveled portions terminate in a vertical plane, $r^2$. The beveled portions are concave on a vertical circle, while the vertical portion is concave on a horizontal circle. The highest portion of the cam is that where the vertical plane $r^2$ is located, from which point the cam decreases in height both back and front. The front termination is somewhat lower than the back termination. This cam may be bolted firmly to the inner side timber or part of the draft-frame, as represented in Fig. 1. A clear representation of the cam is shown in Fig. 4.

I have spoken of the pin or shaft P as being vertical, but I do not wish to be understood as limiting myself strictly to a shaft or center which is only at right angles to a horizontal plane, as the shaft might be set with a slight obliquity. I only refer to it as vertical in contradistinction to horizontal.

I also have laid importance to the location of the rake and reel directly over the axle of the drive-wheel, and, while I regard this an an important feature of my invention, I do not wish to limit myself to this location when my other improvements in the combined rake and reel are found useful in other locations. I always desire, however, to have a rake and reel combined so located below the circumference of the drive-wheel and some distance from the grain side of said wheel that, although its arms revolve entirely around a vertical center, the rake-head and reel-bars shall not be interfered with by the drive-wheel; also that the rake-head and reel-bars shall not interfere with the driver when seated on the machine.

To thus have a rake and reel located is very important, because it is desirable to have the reel-bars strike the grain as near the ground as practicable, also to have the reel-bars and rake enter with the grain at the front of the machine or forward of the cutting apparatus.

From an inspection of the drawings, Fig. 1, it will be evident that a rotary motion around a vertical shaft will be imparted to the rake and reel bars, and during said united revolution of the rake and reel bars an independent motion will be imparted to each of said bars in the path of a vertical circle. The means for accomplishing this result are such that both the reel bars and the rake extend entirely across the platform in sweeping the same, and in leaving the platform they begin gradually to assume a perpendicular position with respect to the platform, and are maintained or supported in this operation by the cam R, and by being thus supported they serve, in turn, to brace their linked fellows and hold them firmly in position with respect to the platform and the grain which is both in the field and on said platform. Thus, I have secured a compact, simple, and firm automatic rake and reel operating on the most approved principle, and while this is the case I have obviated many objections to that class of rakes which employ arms that overhang the draft-frame and drive-wheels of the harvester. One of the objections to most of the rakes of this class is that of cumbersomeness and extensiveness of sweep beyond the inner (grain side) side of the draft-frame over the top of said frame. Another great want experienced with a class of rakes is a means by which the cutting apparatus and rake together may be adjusted by the driver while he is sitting on the draft-frame and while the machine is in motion. My invention meets this want, as the machine can, with any of the known adjusting levers or devices, be adjusted directly on the axle of the drive-wheel while the machine is in motion, and from a seat supported by the draft-frame.

I think it has been deemed impossible to adjust a combined rake and reel while the machine is in motion and while the driver is mounted on the machine. I also think I have made an important improvement in being able to adjust the combined rake and reel by the same means which adjust the cutting apparatus. This end I have attained by having the rake and reel a fixture with the draft-frame and locating it in relation to the drive-wheel as shown.

The driver's seat S with my arrangement can be supported on the draft-frame, as indicated at S′, or it may be otherwise located on the same. I prefer, however, the arrangement of it in the manner represented, as such arrangement gives the manager a spring-seat, and locates him out of the way of danger and in such a position that if accident happens he can step upon the ground in a moment. He is also located so as to throw his weight in a position for balancing the machine.

The device T on the inner side of the outer guard, F, is a horizontal board, in form of a half-spear in longitudinal section. It is located high enough on the guard F to just admit the outer ends of the rake-head and reel-bars above it. By this device the ends of the rake and reel bars are guided or supported and the tangled grain which hangs on the guard F is cleared away therefrom by the rake and reels. The falling grain is also directed upon the platform in a more proper manner for the action of the outermost rake-teeth upon it.

In the drawings I have shown three reel-bars and one rake-head with teeth in it. The number of bars might be changed; so, also, might two or more rake-heads be used. This, however, depends upon the character of the grain and the speed of the machine. The blank-bars bend in the grain to the cutting apparatus, and the rake-head or toothed bar sweeps the cut grain from the platform.

My improvements are applicable to machines with more than one drive or supporting wheel.

I am aware that a continuously-revolving rake and reel combined is not new.

I also am aware that a single arm with rake-teeth in it has been arranged to revolve entirely around a vertical center, and that such a rake has been located at the extreme rear right corner of the platform, a position which I regard as of very doubtful practicability.

I also am aware that a continuously-revolving rake and reel mounted on an auxiliary frame applied within the main draft-frame has had its arms separately hinged.

I also am aware that rake and reel arms which are turned up by segments during their united revolution around a vertical shaft have been mounted on a standard or post of the platform.

I also am aware that a pair of arms have been formed by uniting the two parts which form the pair in such a manner that these parts form a stiff and non-adjustable right angle.

I also am aware that a continuously-revolving combined rake and reel has been combined with a driver's seat, so that the driver could ride on the machine; but I am not aware that a rake operating, constructed, and applied as I have described has ever been devised; nor am I aware that a combined rake and reel has ever been so applied, in combination with a driver's seat and adjusting devices, that the driver, while riding on the machine and while the machine is in motion, could raise and lower the cutting apparatus, platform, and rake and reel at one and the same time; and therefore, while I do not claim, in the construction of a rake, a single rake-arm revolving around a center, nor, broadly, a rake and reel combined which is composed of a series of rake and reel bars arranged around a center, nor a series of such arms hinged independently to the hub, nor a series of such arms hinged to a horizontal shaft, nor all cams in connection with such arms for producing or controlling their motion, I do claim as my invention and desire to secure by Letters Patent—

1. The combined raking and reeling apparatus which rotates around a vertical shaft, when its arms adjust themselves successively from a horizontal to a vertical position, and when the combined apparatus is so located that its arms swing on hinges which are below the highest point of the drive-wheel, and the extent of the sweep of any one of the arms does not interfere with a driver seated upon any part of the draft-frame, which is outside of the drive-wheel, substantially as described.

2. The construction and adaptation of a combined rake and reel which revolves entirely around a vertical center, so that it may be applied to the harvester at a point which is on the inside of the drive-wheel and below the highest point of said wheel, substantially as described.

3. Locating the hinges of the respective arms of the combined rake and reel around a center which is on the inner side of the drive-wheel and below the top of said wheel, substantially as described.

4. Attaching each of the respective arms of the combined rake and reel to a hinge or pivot which is on the inner side of the drive-wheel and below the top of the same, substantially as described.

5. The adaptation of a raking and reeling apparatus combined, which revolves entirely around a vertical center, for application to the inner side of the draft-frame of a harvester at a point below the top of the drive-wheel, substantially as described.

6. The construction of the cam R of the combined rake and reel in the manner described and shown.

7. The construction of the crown-wheel with boxes for a series of rake and reel arms in the manner described and shown.

8. The linking devices described, or their equivalents, applied to the arms of the raking apparatus, substantially as described.

9. The use of the inner bearing of the drive-wheel as the support of the center on which the combined rake and reel revolves, substantially as described.

10. The construction of the shaft or center P of the rake and reel bars and the inner segment of the drive-wheel in one piece, in the manner described.

11. The combination of the cam R, hinged rake and reel bars, and adjustable links, so as to keep the rake and reel bars firmly in contact with the grain in the field and on the platform, substantially as set forth.

12. The arrangement of the sliding and turning spring-pin $p$, incline $p^2$, loose bevel-pinion Q, and the raking and reeling apparatus, substantially as described.

13. The adjustable grain-guard K, constructed substantially as described and applied to the inner front corner of the draft-frame.

14. The combination of a draft-frame, platform, driver's seat, device for adjusting the cutting apparatus, and a continuously-revolving rake and reel combined, substantially as and for the purposes set forth.

15. The combination of the device T on the outer divider and a combined continuously-revolving rake and reel, substantially as described.

16. So constructing a harvester and a raking and reeling apparatus combined that a driver can ride on the machine and from his seat adjust both the rake and reel and cutting apparatus and platform without stopping the machine, substantially as described.

17. So arranging a revolving raking and reeling device having two or more arms—including the rake as one arm—that the driver can sit on the machine and drive the team, the shaft of the rake and reel being at, or nearly at, right angles with the grain-platform, and the arms of rake and reel not sweeping over the frame on which the driver is located, so as to interfere with the driver on his seat, substantially as described.

18. The combination of a central shaft, a revolving hub or crown wheel, a cam, and hinged rake and reel arms, which are bent or curved near their hinging ends, as described, whereby the rake and reel arms, although hinged in rear of the cutting apparatus, are capable of reeling in and raking off grain at the inner front corner of the platform as well as at the outer front corner thereof, and whereby, also, these arms are caused to incline over toward the grain side of the platform when they rise to their greatest altitude, substantially as described.

JAMES S. MARSH.

Witnesses:
R. T. CAMPBELL,
EDW. SCHAFER.